(12) United States Patent
Alhadef et al.

(10) Patent No.: US 6,957,201 B2
(45) Date of Patent: Oct. 18, 2005

(54) CONTROLLED CAPACITY MODELING TOOL

(75) Inventors: Bernard Alhadef, Le Castellet (FR); Marie-Annick Giraud, Signes (FR)

(73) Assignee: Sofresud S.A. (FR)

(*) Notice: Subject to any disclaimer, the term of this patent is extended or adjusted under 35 U.S.C. 154(b) by 553 days.

(21) Appl. No.: 10/037,355

(22) Filed: Dec. 21, 2001

(65) Prior Publication Data

US 2004/0015460 A1 Jan. 22, 2004

Related U.S. Application Data

(63) Continuation-in-part of application No. 09/858,814, filed on May 16, 2001, which is a continuation of application No. PCT/FR99/02810, filed on Nov. 16, 1999.

(30) Foreign Application Priority Data

Nov. 17, 1998 (FR) .......................................... 98 14422

(51) Int. Cl.$^7$ ............................................. G06F 15/18
(52) U.S. Cl. ......................................... 706/16; 706/23
(58) Field of Search .................................... 706/16, 23

(56) References Cited

U.S. PATENT DOCUMENTS 5,796,922 A * 8/1998 Smith ......................... 706/23
6,000,833 A * 12/1999 Gershenfeld et al. ......... 84/600

OTHER PUBLICATIONS

Rossius, R et al."A short note about the application of polynomial kernels with fractional degree in support vector learning", *Machine Learning: ECML–98, 10$^{th}$ European Conference on Machine Learning.*, Apr. 21, 1998, pp. 143–148, XP002115741.

Jonathan R. M. Hosking et al, "A statistical perspective on data mining", *Future Generation Computer Systems*, 13 (1997), pp. 117–134.

* cited by examiner

*Primary Examiner*—George Davis
(74) *Attorney, Agent, or Firm*—DLA Piper Rudnick Gray Cary US LLP

(57) ABSTRACT

A process for modeling numerical data for forecasting a phenomenon relates to constructing a model by processing and learning on collected data. The fit and robustness of the model are evaluated and the model parameters are adjusted to select an optimal model in the form of a $D^{th}$ order polynomial. A trade-off between learning accuracy and learning stability is controlled by adding to a covariance matrix a perturbation in the form of the product of a scalar $\lambda$ times a matrix H or in the form of a matrix H dependent on a vector of k parameters $\Lambda=(\lambda_1, \lambda_2, \ldots \lambda_k)$. A data partition step can divide the data into a first subset for constructing the model and a second subset for adjusting the value of the model parameters according to a validity criterion obtained from data that was not used to construct the model.

40 Claims, 1 Drawing Sheet

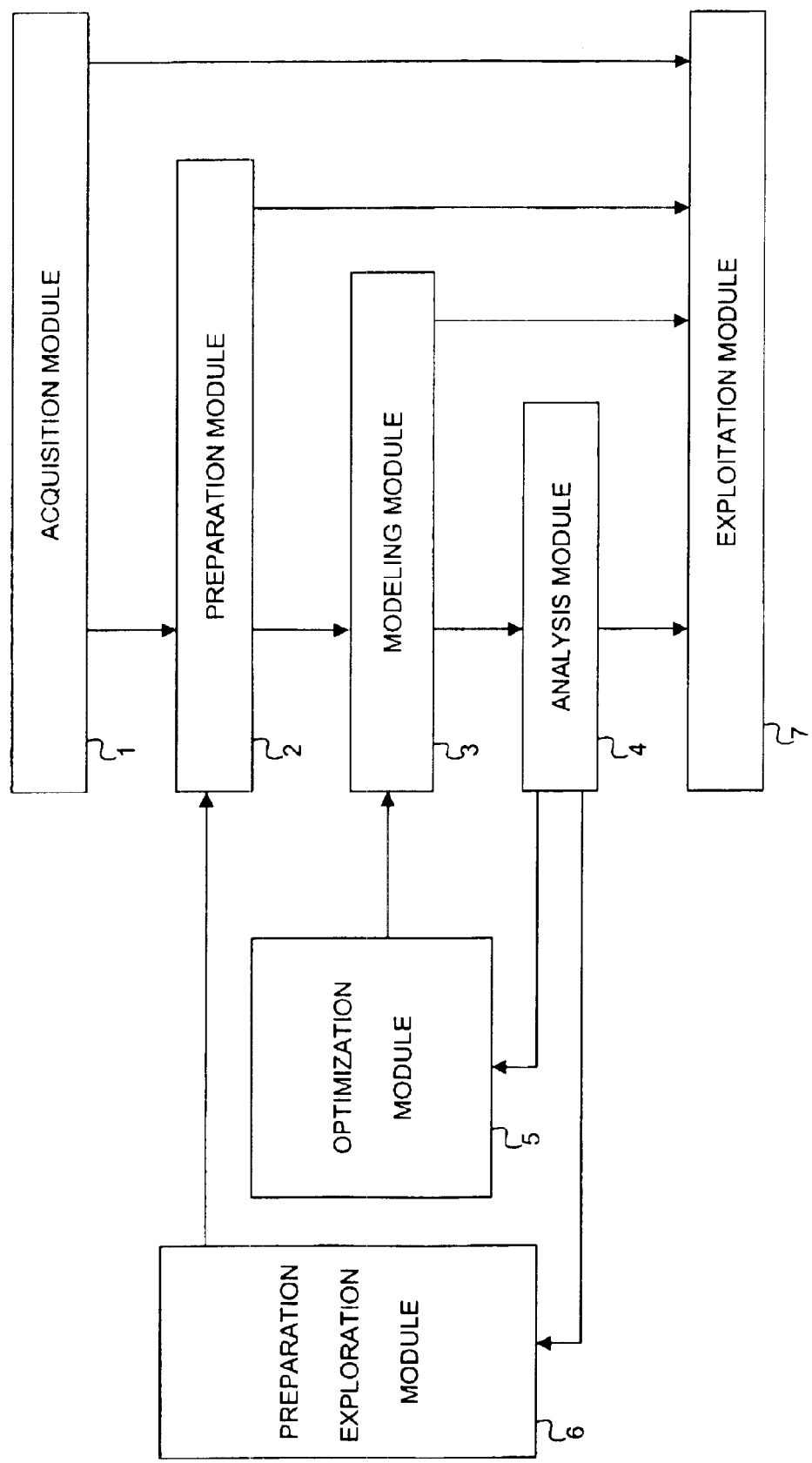

CONTROLLED CAPACITY MODELING TOOL

RELATED APPLICATIONS

This is a continuation-in-part of U.S. Ser. No. 09/858,814, filed May 16, 2001, which is a continuation of International Application No. PCT/FR99/02810, with an international filing date of Nov. 16, 1999, which is based on French Patent Application No. 98/14422, filed Nov. 17, 1998.

FIELD OF THE INVENTION

This invention relates to machine learning and modeling methods.

BACKGROUND

Modeling methods are known generally in the state of the art, for example from the following articles:

HOSKING J. M. R. et al. "A statistical perspective on data mining" FUTURE GENERATION COMPUTER SYSTEMS, November 1997, ELSEVIER, Vol. 13, No. 2–3, pages 117–134, which describes the use of statistical methods for processing large volumes of data;

ROSSIUS R. et al. "A short note about the application of polynomial kernels with fractional degree in support vector learning" MACHINE LEARNING ECML-98. $10^{th}$ European Conference on Machine Learning. Proceedings CHEMNITZ Apr. 21–23, 1998, pages 143–148, pertaining to the application of classification and forecasting methods.

The learning problem can be considered as a problem of finding dependencies using a limited number of observations. Thus, it is a question of choosing from a given set of functions $f(x,\alpha)$, $\alpha \in A$, where A is a set of parameters, the one which best approximates the output.

If $L(y,f(x,\alpha))$ is a measure of the deviation between the real output y and the output predicted by the model $f(x,\alpha)$, it is thus necessary to minimize the effective risk:

$$R(\alpha) = \int L(y,f(x,\alpha))dF(x,y) \quad \text{(Eq. 1)}$$

while knowing that the joint probability distribution function $F(x,y)$ is unknown and that the only available information is contained in the k observations $(x_1, y_1) \ldots ,(x_k, y_k)$ from the learning set.

Classically, one determines the function that minimizes the empirical risk calculated on the basis of the learning set:

$$Remp = \sum_{i=1}^{k} L(y_i, f(x_i, \alpha)) \quad \text{(Eq. 2)}$$

One then postulates that this function would be the best approximation of the function that minimizes the effective risk given by (Eq. 1).

The problem posed is to know the extent to which a system constructed on the empirical risk minimization inductive principle (Eq. 2) is generalizable, i.e., enables minimizing the effective risk (Eq. 1) including data that have not been learned.

Mathematically, a problem is said to be well-posed when it allows a unique solution and this solution is stable, i.e., that a small deviation in the initial conditions can only modify in an infinitesimal manner the form of the solutions. Problems that do not satisfy these conditions are referred to as ill-posed problems.

It occurs frequently that the problem of finding f satisfying the equality $A,f=u$ is ill-posed: even if there exists a unique solution to this equation, a small deviation of the right-hand side of this equation can cause large deviations in the solution.

And thus if the right-hand member is not exact ($u_\epsilon$ instead of u with $\|u-u_\epsilon\| \leq \epsilon$), the functions that minimize the empirical risk $R(f) = \|Af-u_\epsilon\|^2$ are not necessarily good approximations of the desired solution, even if $\in$ tends to 0.

An improvement in solving such problems consists in minimizing another so-called regularized functional of the form:

$$R(f) = R(f) + \lambda(\in)\Omega(f) \quad \text{(Eq. 3)}$$

where:

$\Omega(f)$ is some functional belonging to a special type of operators referred to as regularizing;

$\lambda(\in)$ is an appropriately chosen constant depending on the level of noise existing on the data.

One then obtains a sequence of solutions that converge to the desired one as $\in$ tends to 0. Minimizing the regularized risk rather than the empirical risk allows obtaining from a limited number of observations a solution that is generalizable to any case.

Introduction of the regularizing term makes it feasible to provide with certainty a unique solution to an ill-posed problem. This solution can be slightly less accurate than the classic one, but it possesses the fundamental property of being stable, thus endowing the results with greater robustness.

The methods for solving ill-posed problems demonstrate that there exist other inductive principles that enable obtaining a better regularization capacity than the principle consisting in minimizing the error made on the learning set.

Therefore, the main objective of theoretical analysis is to find the principles making it feasible to control the generalization capacity of learning systems and to construct algorithms that implement these principles.

Vapnik's theory is the tool that establishes the necessary and sufficient conditions for a learning process based on the empirical risk minimization principle to be generalizable, leading to a new inductive principle referred to as the structural risk minimization principle. It can be demonstrated that the effective risk satisfies an inequality of the form:

$$R(\alpha) < R_{emp}(\alpha) + F(h,k) \quad \text{(Eq. 4)}$$

where:

h is the Vapnik-Chervonenkis dimension of the set of functions $f(x,\alpha)$ among which the solution is sought;

k is the number of observations available for constructing the model;

F is an increasing function of h and a decreasing function of k.

It can be seen immediately that, since the number k of available observations is finite, the fact of minimizing the empirical error is not sufficient for minimizing the effective error. The general idea of the structural risk minimization principle is to take into account the two terms of the right-hand member of the equation (Eq. 4), rather than only the empirical risk. This implies constraining the structure of the set of the functions $f(x, \alpha)$ among which the solution is sought so as to limit or even control the parameter h.

According to this principle, the development of new algorithms enabling control of the robustness of learning processes would be advantageous.

SUMMARY OF THE INVENTION

This invention relates to a process for modeling numerical data from a data set including collecting data for development of a model with a data acquisition module, processing the data to enhance its exploitability in a data preparation module, constructing a model by learning on the processed data in a modeling module, evaluating the fit and robustness of the obtained model in a performance analysis module, adjusting the model parameters to select the optimal model in an optimization module, wherein the model is generated in the form of a $D^{th}$ order polynomial of the variables used in input of the modeling module, by controlling the trade-off between the learning accuracy and the learning stability with the addition to the covariance matrix of a perturbation during calculation of the model in the form of the product of a scalar X times a matrix H or in the form of a matrix H dependent on a vector of $\lambda$ parameters $\Lambda=(\lambda_1,\lambda_2, \ldots \lambda_k)$ where the order D of the polynomial and the scalar $\lambda$, or the vector of parameters $\Lambda$, are determined automatically during model adjustment by the optimization module by integrating an additional data partition step performed by a partition module which consists in constructing two preferably disjoint subsets: a first subset comprising training data used as a learning base for the modeling module and a second subset comprising generalization data destined to adjust the value of these parameters according to a model validity criterion obtained on data that did not participate in the training, and where the matrix H is a positive defined matrix of dimensions equal to the number p of input variables into the modeling module, plus one.

The invention also relates to a device for modeling numerical data from a data sample including means for acquiring input data, means for processing the input data, means for constructing a model by learning on processed data, means for analyzing performances of the obtained model, means for optimizing the obtained model, wherein the model is generated in the form of a $D^{th}$ order polynomial of the variables used in input of the modeling module, by controlling the trade-off between the learning accuracy and the learning stability with the addition to the covariance matrix of a perturbation during calculation of the model in the form of the product of a scalar X times a matrix H or in the form of a matrix H dependent on a vector of k parameters $\Lambda=(\lambda_1,\lambda_2, \ldots \lambda_k$ where the order D of the polynomial and the scalar $\lambda$, or the vector of parameters $\Lambda$, are determined automatically during model adjustment by the optimization module by integrating additional means for splitting the data so as to construct two preferably disjoint subsets: a first subset comprising training data used as a learning base for the modeling module and a second subset comprising generalization data destined to adjust the value of these parameters according to a model validity criterion obtained on data that did not participate in the training, and where the matrix H is a positive defined matrix of dimensions equal to the number p of input variables into the modeling module, plus one.

BRIEF DESCRIPTION OF THE DRAWING

The drawing is a flow/block diagram of a modeling device/process in accordance with aspects of the invention.

DETAILED DESCRIPTION

The invention provides a model for forecasting the evolution of a phenomenon from a numerical data set of any size. It can be implemented in the form of specifically designed integrated circuits and then present itself in the form of a specific element functioning in an independent manner. It can also be implemented in software form and be integrated in a computer program. It can, especially, be used for processing a digital signal in an electronic circuit. In a more general application, it enables the modeling of non-linear phenomena, the analysis of phenomena by means of immediately exploitable formulas and the generation of robust models. The accuracy enabled by these novel methods permits an appreciable increase in machine learning rates.

The invention can also be used in the domain of risk analysis by insurance companies. These companies store, in a form that is structured to varying degrees, the characteristics of drivers, their vehicles and accidents they have been involved in or caused. It is possible to determine which are at high risk based on these available elements.

In the modeling of physical phenomena, the analyzed events correspond generally to the data captured by the various sensors in the measurement line. It is possible, for example, to determine which are the combinations of factors that are the source of defective products and, thus, anticipate problems and improve productivity.

In the domain of flow management, these events would correspond instead to information collected over time. It is possible, for example, to determine the relations existing among the considered flows and the calendar data, or variables that are more specific to the application under consideration such as meteorological data for the consumption of electricity or promotional periods for sales analysis, which enables better management of stocks and of workloads of manufacturers.

In the banking sector, the events would represent, on the one hand, the profile of the clients and, on the other hand, a description of the operations. The modeling would reveal, for example, the risk factors linked to individuals and to operations.

The invention pertains to a new modeling technology of very general application, the essential characteristics of which concern the efficiency of the method, the simplicity of the obtained models and their robustness, i.e., their performance on data that have not been used for learning. The implementation of this technique in an electronic or mechanical information-processing system equipped with sensors and with model exploitation functions enables conception of a tool capable of adapting to and controlling an environment in which there exist complex and changing phenomena, and in which the sensors only partially report the set of the phenomena brought into play. Furthermore, the utmost simplicity of the obtained models provides the user of the tool with an intuitive comprehension of the phenomena he seeks to control.

The invention uses both classical techniques, such as calculation of covariance matrices, as well as more recent theories, such as those of statistical regularization and consistency of learning processes. The invention consists in that the covariance matrices are not used as such but according to a new process which consists on the one hand in perturbing the covariance matrix in a certain way and on the other hand in adjusting the level of added noise in another way. The way to add and control noise to the data will be described here mathematically but it is feasible to implement these operations in an electronic or mechanical way.

The invention consists in a process for modeling numerical data from a data set, comprising an input data acquisition step which consists in collecting the data required for the development of the models, performed by a data acquisition module, an input data preparation step which consists in processing the data so as to make them more exploitable, performed by a data preparation module, a modeling step which consists in constructing a model by learning on the processed data, performed by a modeling module, a performance analysis step which consists in evaluating the fit and the robustness of the obtained model, performed by a performance analysis module, a model optimization step which consists in adjusting the parameters of the model so as to select the optimal model, performed by an optimization module, characterized in that one generates the model in the form of a $D^{th}$ order polynomial of the variables used in input of the modeling module, by controlling the trade-off between the learning accuracy and the learning stability with the addition to the covariance matrix of a perturbation during calculation of the model in the form of the product of a scalar $\lambda$ times a matrix H or in the form of a matrix H dependent on a vector of k parameters $\Lambda=(\lambda_1,\lambda_2,\ldots\lambda_k)$ where the order D of the polynomial and the scalar $\lambda$, or the vector of parameters $\Lambda$, are determined automatically during model adjustment by the optimization module by integrating an additional data partition step performed by a partition module which consists in constructing two preferably disjoint subsets: a first subset comprising training data used as a learning base for the modeling module and a second subset comprising generalization data destined to adjust the value of these parameters according to a model validity criterion obtained on data that did not participate in the training, and where the matrix H is a positive defined matrix of dimensions equal to the number p of input variables into the modeling module, plus one.

The matrix H can be such that $H(p+1,p+1)$ is different from at least one of the terms $H(i,i)$ for $i=1, 2, \ldots, p$.

Subsequently, two numbers are considered to be close when their relative difference is less than about 10%.

The matrix H advantageously verifies the following conditions: $H(i,i)$ is close to 1 for $i$ 1, 2, ..., p, $H(p+1,p+1)$ is close to 0 and $H(i,j)$ is close to 0 for i different from j. In a variant, the matrix H verifies the following conditions: $H(i,i)$ is close to a variable a for $i=1, 2, \ldots, p$, $H(p+1,p+1)$ is close to a variable b, $H(i,j)$ is close to a variable c for i different from j with $a=b+c$.

In an advantageous variant, the matrix H verifies the following additional conditions: a is close to $1-1/p$, b is close to 1, c is close to $-1/p$, where p is the number of variables of the model.

The base data partition can be performed by an external software program of the spreadsheet or database type, or by specific tools.

To construct the two training and generalization subsets, one advantageously performs a pseudorandom sampling, or a pseudorandom sampling keeping the representativeness of the input vectors in the two subsets, or a sequential sampling. In a variant, one performs a first partition of the data into a subset containing the training and generalization data and a subset containing test data.

One preferred variant consists in selecting the pair of parameters (D, $\lambda$) or (D, $\Lambda$), which minimizes the mean error, or the weighted mean error, or the mean quadratic error or the weighted mean quadratic error on the generalization data subset.

The data are advantageously pre-processed by statistical normalization of columns of data, by reconstitution of missing data or by detection and possible correction of outlying data.

This preparation can be performed by a monovariable or multivariable polynomial development applied to all or part of the inputs, by a trigonometric development of the inputs or by an explicative development of dated inputs.

One preferred variant consists in using a change of coordinates stemming from a principal components analysis with possible simplification or using one or more temporal shifts before or after all or part of the columns containing the time variables.

One can advantageously add a preparation explorer which uses a description of the possible processings by the user and an exploration strategy based either on a pure performance criterion in training or in generalization, or on a trade-off between these performances and the capacity of the learning process obtained.

In one variant, one adds to the modeling process an exploitation module providing monovariable or multivariable polynomial formulas descriptive of the phenomenon, trigonometric formulas descriptive of the phenomenon, or descriptive formulas of the phenomenon containing date developments in calendar indicators.

The general synopsis of the invention is presented in the Drawing. It comprises all or part of the following elements:

a data acquisition module (1);

a data preparation module (2);

a modeling module (3);

a performance analysis module (4);

an optimization module (5);

a preparation exploration module (6);

an exploitation module (7).

The purpose of the data acquisition module (1) is to collect information required for the elaboration of the models. The collection is performed by means of acquisition configuration information, which is transmitted by an operator, either once and for all upon the conception of the system, or in a dynamic manner as a function of new requirements identified over the course of its exploitation. The data can be collected by means of sensors of physical measurements, or in databases by means of requests, or both. In configuring the acquisition, the operator defines for the tool a modeling problem to be treated. On demand, this module produces a rough history of the phenomenon, characterized by a table containing in columns the characteristic parameters of the phenomena (stemming for example from sensors) and in rows the events, each of which corresponds to one observation of the phenomenon. This historic table can be supplemented by a description of the data consisting of information that can be useful for the modeling, and then for the exploitation of the models. The description typically includes the following information:

name of the column;

reference of the associated sensor;

nature of the data (boolean, integer, numerical, dated, region, etc.).

The data preparation module (2), also referred to as the data processing module, enables refinement of the characteristics of the raw data stemming from the acquisition. Based on the historic table and the data description, this module provides a more complex table in which each column is obtained from a processing operating on one or more columns of the historic table. The processes performed on a column can be in particular:

a transformation of the column by a classic function (log, exp, sin, etc.), with each element of the column being substituted by the result of the selected function;

a K order monovariable polynomial development, generating K columns from one input column x, corresponding to the variables $x, x^2, \ldots, x^K$;

a spectral development of period T and of order N, generating 2K columns from one input column x, the first K columns being equal to $\cos(2\pi ix/T)$ (for i between 1 and K), and the last K columns being equal to $\sin(2\pi ix/T)$ (for i between 1 and K);

a development in calendar indicators, generating for one dated input column a list of more specific indicators representative of the events associated with this date (annual, monthly, weekly development, Boolean indicators for the day of the week, holiday, extended weekend, day before extended weekend, day after extended weekend, indicators of holiday, of beginning and end of holidays specific to each region, etc.).

The data preparation module can also act on multiple columns or multiple groups of columns. It can especially perform the following constructions:

based on a dated column and a region column, the preparator can carry out a development in meteorological indicators (wind, precipitation, hygrometry, etc.) for the day itself or adjacent days. This operation is executed from a meteorological database;

based on two groups of columns G1 and G2, the preparator can create a new group of columns G3 comprising the cross-products between all of the columns of the two groups;

based on a group of columns G, comprising p variables $x_1$, $x_2, \ldots x_p$, the preparator can generate all the polynomial terms of degree less than or equal to K, thus a group of columns each comprising a term of the type $(x_1)^{K1}(x_2)^{K2} \ldots (x_p)^{KP}$ with $(K1+ \ldots +Kp) \leq K$, with all of the Ki being between 0 and K.

The data preparation module can also execute operations on rows, notably:

centering, which subtracts from each element of a column the mean obtained on its column;

reduction, which divides each element of a column by the standard deviation of its column;

statistical normalization which links together the two preceding operations.

The data preparation module can also execute global operations in a manner especially so as to reduce the dimension of the problem:

elimination of a column if its standard deviation is zero;

elimination of a column whose correlation with a preceding column is greater than a threshold;

elimination of a column whose correlation with the output is less than a threshold;

realization of a principal components analysis which leads to a change of coordinates by favoring the principal axes of representation of the phenomenon, and the possible elimination of nonsignificant columns.

The data preparation module also enables defining the processing of missing values. An event (row) containing one or more missing values will be ignored by default. Nevertheless, the user can fill in the missing value according to various criteria:

mean of the value on the column;

mean of the value on a subset of the column;

the most frequent value (Boolean or enumerated);

selection of a fixed substitution value;

estimation of this value based on a modeling function of other variables.

Another manner of processing missing values is to consider them as a particular value of the variable that can be taken into account by creating an additional boolean column indicating whether the value is present or not.

The data preparation module also enables detection and processing of suspicious values. Detection is based on the following criteria:

data outside a range defined by the operator;

data outside a range calculated by the system (for example, range centered on the mean value and large by K times the standard deviation, analysis of the extreme percentiles, etc.);

for Boolean or enumerated data, values whose number of occurrences is less than a given threshold.

Samples containing one or more suspicious values can be processed following the same methods as those proposed for missing values.

It is also possible to prepare the missing, outlying or exceptional data in one or more clusters so as to regroup them into the same category for application to them of a particular processing (for example: a weighting, a "false alarm" category, etc.).

In one variant, one calculates for each input variable its explicative power (or discriminant power) in relation to the phenomenon under study. This process enables, on the one hand, to select the preponderant variables in a list and to eliminate minor variables and, on the other hand, to explain the phenomenon being studied. Preparation of the data can be performed by segmentation algorithms which can, for example, be of the "decision tree" or "support vector machine" type.

There is preferably associated with each value of a "nominal" variable (for example the zip code or "SIC" code), a table of values expressing its significance in relation to the phenomenon under study (for example: number of inhabitants of the town, income level of the town, average age of the town inhabitants, etc.). It is then feasible to encode the nominal variables using a table of Boolean or real variables.

For time variables of type X(t), the preparation module also enables automatic generation of columns corresponding to the variable X taken at different anterior or posterior times. Thus, the variable X(t) comes to be substituted by a group of variables: $\{X(t-kdt), \ldots, X(t-dt), X(t), X(t+dt), \ldots, X(t+ndt)\}$.

In flow modeling applications, time data (date) are transformed by applying transfer rules stemming from the knowledge of the phenomenon under study. For example, for financial flow, when a day is a holiday the associated amounts are transferred according to a set rule in part over the preceding days and in part over the following days with weighting coefficients.

It is also feasible to process the flows (for example, financial exchanges) by identifying the periodic payment dates (for example, monthly payment dates) and applying the transfer rules governing each payment date (for example: if the payment date falls on a holiday, transfer the transactions to the following day, etc.).

The data preparation module offers all of these functionalities on a unitary basis but also allows the user to combine these processings by means of a suitable control language. All these data preparation functionalities are also accessible to the preparation exploration module. The preparation process is terminated preferably by a statistical normalization operation.

Due to its novel technology, the modeling module (3) associated with the performance analysis module (4) and the optimization module (5), makes it feasible to take into account a large number of model input parameters while controlling accuracy and robustness of the model. It is perfectly suitable for the data preparator described above, which is likely to generate a very large number of often correlated explicative columns, and it makes it feasible to obtain simple, robust and efficient models.

The modeling module uses a history of the data after preparation. It can be used on all these data, but produces all of its performance when it is only used on part (the rows) of these data, with this part being defined by the optimization module (5) as a function of the results determined by the performance analysis module (4).

The modeling module proceeds in the following manner:

the table of the input data after preparation and generation of the $D^{th}$ order variables constitutes a matrix called [X] of p columns, the outputs corresponding to these inputs constitutes a column vector [Y];

one constructs a matrix [Z] from the matrix [X] by completing it to the right by a column of 1;

the model vector [w] is obtained by the following formula:

$$[W]=({}^t[Z][Z]+\lambda[H])^{-1}({}^t[Z][Y])$$

where [H] is a positive defined matrix and $\lambda$ is a scalar, the introduction of the regularizing term $\lambda[H]$ making it possible to compensate for the ill-conditioning of the matrix ${}^t[Z][Z]$ by assuring the existence of the inverse matrix $({}^t[Z][Z]+\lambda[H])^{-1}$.

The output y* of the model for an input vector [x]=(x1, ..., xp) is obtained by adding a constant equal to 1 at the back of the vector [x], so as to thereby obtain the vector [z]=(x1, ..., xp, 1), then in carrying out the scalar product between the vector [w] and the vector [z], i.e., $y^*=w_1x_1+ \ldots +w_px_p+w_{p+1}$.

There are many possible forms for the matrix [H] used in the construction of the model. In a simple form, the matrix [H] can be written:

$$\begin{bmatrix} 1 & & (0) & \\ & \ddots & & \\ (0) & & 1 & \\ & & & 0 \end{bmatrix}$$

The matrix [H] can also take on more developed forms, notably:

$$\begin{bmatrix} (1-1/p) & -1/p & \cdots & -1/p & 0 \\ X & \ddots & \ddots & \vdots & \vdots \\ \vdots & \ddots & \ddots & -1/p & \vdots \\ \vdots & & \ddots & (1-1/p) & 0 \\ X & \cdots & \cdots & X & 1 \end{bmatrix}$$

The different forms of the matrix [H] make it feasible to obtain satisfactory models but the user could favor one or the other of the forms according to his a priori knowledge of the form of the desired model.

The very construction of the model and of the perturbation matrix [H] confer on the parameter $\lambda$ or on the vector of parameters $\Lambda=(\lambda_1, \lambda_2, \ldots, \lambda_k)$ particular properties, and notably that of acting on the effective capacity of the learning structure by controlling the trade-off between the model fit and its stability.

The value of the parameter $\lambda$ can be set a priori by the user according to his knowledge of the phenomenon to be modeled. However, the invention yields its full potential when the selection of the value to be used for the parameter $\lambda$ is assigned to a module for the automatic determination of the optimal value.

The purpose of the optimization module (5) is to select the optimal value of the pair of parameters (D, $\lambda$) or (D, $\Lambda$). For this, the optimization module splits the historical data set after preparation and generation of the $D^{th}$ order variables into two subsets. The matrix [X] used by the modeling module is only constituted of data from the first subset (referred to as "training space"). The optimization module automatically activates the modeling module while varying the parameter $\lambda$. The performances of the models constructed in this manner are evaluated on the untrained data of the second subset (referred to as "generalization space") and the parameter $\lambda$ selected by the optimization module for the order D considered is the one that permit to obtain an optimum of performances on this second subset according to a validity criterion of the model.

The data partition can be performed directly by the operator, but it can also be handled by the system in various manners. Thus, the base data partition module can perform a pseudorandom sampling or a sequential sampling to constitute the training and generalization subsets for example: 70% for training and 30% for generalization. In one variant, there is constituted a third subset (referred to as "forecasting space" or "test space") containing data that were used neither for training nor for generalization. Thus, the data partition module can achieve a first sequential sampling into two subsets (for example: the first 80% of the data for the first subset comprising the training and generalization data, and the remaining 20% for the second subset comprising the test data), then a second pseudorandom sampling on the first subset (for example 70% in training and 30% in generalization for splitting the training and generalization subsets).

The data partition module can also execute a sampling of the type involving selection of one (or more) sample(s) according to a law that has been programmed in advance (for example: every N samples) for the generation of the training, generalization and/or test subsets.

The performance analysis module (4) evaluates the performances of the obtained model in relation to certain criteria, the performances being evaluated either on the basis of the training space, i.e., on the data used for the calculation of the matrix [X], or on the generalization space, i.e., on the data that did not participate in the training but were used for the selection of the pair of parameters (D, $\lambda$) or (D, $\Lambda$), or on the test space, i.e., on the data that were not used for either training or generalization. The performances are evaluated by comparing on the designated space the vector [y], corresponding to the real value of the output, with the vector [y*], corresponding to the value of the output obtained by application of the model. The comparison can be done with classic statistical error indicators, with or without screening. For example, one can use the mean error, or the mean quadratic error or the mean quadratic error weighted by a cost function.

The model validity criterion used by the optimization module can be selected by the operator from among all of the possibilities offered by the performance analysis module.

The analysis module also enables filtering the data of a history either in rows or in columns. The row filter criterion relates to the modeling error. This criterion allows separation of the individuals conforming to the model from the nonconforming ones. The nonconforming individuals can be due to anomalies found at the level of the sensors, but they can also reveal an abnormal or original behavior, information which can be very valuable according to the context.

The column filtering criterion is performed as a function of the model vector [w]. This enables arranging in order the factors influencing the phenomenon as a function of their positive or negative contribution to the phenomenon.

The preparation exploration module (6) constitutes the second level of adjustment of the capacity of the learning structure. This module links together the modelings (with or without optimization of the scalar λ) by changing the preparation of the data at each step. This module uses a description of the possible preparations provided by the user. This description defines in an ordered way columns, groups of columns and preparations operating on these columns or groups of columns. For example, the description of the possible preparations can define among the variables of the base data set:

- a possible polynomial development of column 1, from 1 degree at a minimum to 5 degrees at a maximum;
- a possible trigonometric development of column 2 from 1 degree at a minimum to 7 degrees at a maximum;
- a possible multivariable polynomial development on columns 4 to 8 from 1 degree at a minimum to 3 degrees at a maximum;
- all or part of the other columns without specific processing.

This description enables formalization of the user knowledge in relation to the phenomenon to be modeled. The preparation explorer thus relieves the user of the tedious tasks of exploration of the possible preparations by carrying out the preparation of the data, the modeling, analysis of performances and recording of the test references and the results obtained.

This exploration is performed by means of the parameters left free in the description filled out by the user. The explorer can activate different methods in order to achieve this function. Among these methods, the simplest is the systematic exploration of all the possible combinations in the parameters left free by the operator. However, this method can be very costly in terms of calculation time, given that the number of calculations increases exponentially with the number of parameters.

Another method consists in executing random sampling in the possible parameters and then sorting the results in a manner so as to approach the zones of greatest interest.

A third method consists in implementing a control of the capacity of the second level learning process. For this, one uses the fact that for each type of development (polynomial, trigonometric, etc.), the capacity of the learning process increases with the parameter (degree of development). The method starts from a minimal preparation (all of the parameters are at their minimum), and then it envisages all of the possible preparations by incrementing a single parameter. The method launches a modeling for each of the obtained preparations and selects from among the set of obtained models the one that led to the best performance according to a certain criterion.

Depending on the objective of the user, this criterion can be:
- a minimum of error with or without screening on the unlearned data;
- the ratio between one of the preceding criteria and the capacity of the learning structure after preparation (this capacity can also be approximated by means of known formulas);
- the ratio between the increase in one of the preceding criteria and the increase in the capacity of the learning structure;
- a function increasing with an error criterion such as described above, and decreasing with the capacity of the learning structure.

The exploitation module (7) enables the tool to transmit the modeling results to a user or to a host system. In a simple version, it can calculate the output of the model evaluated on unlearned data and produce indicators regarding the reliability of the estimation. In a more developed version, the exploitation module can transmit to a host system the generated model, its preparation and its performances. In an even more developed version, the tool is entirely monitored by the host system, such as an industrial process control system, for example, by conferring on it novel potentialities in terms of capacity of adaptation to a complex and changing environment.

A post-processing function (which can be derived from the coefficient λ) allowing calculation of the accuracy of the generated model on new unlearned data can be applied to the result.

When the database is only composed of few elements characteristic of the phenomenon to be modeled, the training, generalization and forecasting subsets can be not disjoint (for example: use of data belonging to the "training space" subset for generating the "generalization" or "forecasting" spaces).

The prepared data can be shared among different uses of the data modeling process in accordance with the invention.

The data set is managed in a specific environment ensuring the availability of the information by using, for example, a file system, a database or a specific tool. It is possible to provide simultaneous access to the data to multiple users. For this purpose, one defines a relational structure containing the variables, the phenomena to be modeled and the models for storing and managing the base data set and the formulas descriptive of the phenomena.

What is claimed is:

1. A process for modeling numerical data for forecasting a phenomenon from a data set relating to the phenomenon, the process comprising:

collecting data with a data acquisition module for describing the phenomenon;

processing the data in a data preparation module to enhance exploitability of the data;

constructing an initial model in a modeling module by learning on the processed data, the initial model having a fit to the data, robustness and parameters;

evaluating the fit and robustness of the initial model in a performance analysis module; and adjusting the model parameters in an optimization module to select an optimal model, wherein the optimal model is generated in the form of a $D^{th}$ order polynomial derived from variables input into the modeling module by controlling a trade-off between learning accuracy and learning stability, the trade-off being controlled by adding to a covariance matrix a perturbation in the form of a product of a scalar λ times a matrix H or in the form of a matrix H dependent on a vector of k parameters $\Lambda=(\lambda_1,\lambda_2, \ldots \lambda_k)$ during calculation of the optimal model, wherein the order D of the polynomial and the scalar λ, or the vector of parameters Λ, are determined automatically during model adjustment by the optimization module by integrating an additional data partition step performed by a partition module, the data partition step comprising the step of constructing a first subset comprising training data used as a learning base for the modeling module and a second subset comprising generalization data used to build a model validity criterion to adjust the value of the order D, the scalar $\lambda$ or the vector of parameters $\Lambda$, and wherein the matrix H is a positive defined matrix of dimensions equal to a number p of variables input into the modeling module, plus one.

2. The data modeling process according to claim 1, wherein the matrix H verifies the following conditions: H(i,i) is close to 1 for i between 1 and p, H(p+1,p+1) is close to 0 and H(i,j) is close to 0 for i different from j.

3. The data modeling process according to claim 1, wherein the matrix H verifies the following conditions: H(i,i) is close to a for i between 1 and p, H(p+1,p+1) is closed to b, H(i,j) is closed to c for i different from j and a=b+c.

4. The data modeling process according to claim 3, wherein the matrix H verifies the following additional conditions: a is close to 1−1/p, b is close to 1, c is closed to −1/p.

5. The data modeling process according to claim 1, wherein the matrix H verifies the following condition: H(p+1,p+1) is different from at least one of the terms H(i,i) for i between 1 and p.

6. The data modeling process according to claim 1, wherein the data partition step is performed by an operator using an external software program.

7. The data modeling process according to claim 1, wherein the data partition module performs a pseudorandom sampling to construct two subsets from the base data.

8. The data modeling process according to claim 1, wherein the data partition module performs a pseudorandom sampling to construct two subsets from the data, while keeping the statistical representativeness of the input vectors in the two subsets.

9. The data modeling process according to claim 1, wherein the data partition module performs a sequential sampling to construct two subsets from the data.

10. The data modeling process according to claim 1, wherein the data partition module performs a first split of the data into two subsets, with the first subset comprising the training and generalization data and the second subset comprising the test data.

11. The data modeling process according to claim 1, wherein the data partition module performs a sampling of the type selecting at least one sample according to a law programmed in advance for generation of the training, generalization and/or test subsets.

12. The data modeling process according to claim 1, wherein the optimization module selects the pair of parameters (D, $\lambda$) or (D, $\Lambda$) that minimizes one of the following:
mean error on the subset of the generalization data;
weighted mean error on the subset of the generalization data;
mean quadratic error on the subset of the generalization data;
weighted mean quadratic error on the subset of the generalization data.

13. The data modeling process according to claim 1, wherein the data preparation module performs a statistical normalization of columns of data.

14. The data modeling process according to claim 1, wherein the data preparation module fills in missing data by one of the following:
mean of the value on a column (real type data);
mean of the value on a subset of a column (real type data);
most frequent value (Boolean or <<nominal>> type data);
most frequent value on a subset of a column (Boolean or <<nominal>> type data);
selection of a fixed substitution value;
estimation of the substitution value on the basis of a modeling as a function of other variables.

15. The data modeling process according to claim 1, wherein the data preparation module performs detection of outlying data according to one or more of the following criteria:
data outside a range defined by an operator;
data outside a range calculated by the system;
Boolean or enumerated data whose number of occurrences is below a given threshold.

16. The data modeling process according to claim 1, wherein the data preparation module performs a substitution of outliers by one of the following:
mean of the value on the column (real type data);
mean of the value on a subset of the column (real type data);
most frequent value (Boolean or <<nominal>> type data);
most frequent value on a subset of the column (Boolean or <<nominal>> type data);
selection of a fixed substitution value;
estimation of the substitution value on the basis of a modeling as a function of other variables.

17. The data modeling process according to claim 1, wherein the data preparation module performs a monovariable or multivariable polynomial development on all or part of the input data.

18. The data modeling process according to claim 1, wherein the data preparation module performs a periodic development of the input data.

19. The data modeling process according to claim 18, wherein the modeling further comprises model exploitation performed by an exploitation module which provides periodic formulas descriptive of the phenomenon.

20. The data modeling process according to claim 19, wherein periodic formulas descriptive of the phenomenon use trigonometric functions.

21. The data modeling process according to claim 18, wherein the periodic development is a trigonometric development.

22. The data modeling process according to claim 1, wherein the data preparation module performs an explicative development of input data comprising dates.

23. The data modeling process according to claim 22, wherein the modeling further comprises model exploitation performed by an exploitation module which provides descriptive formulas of the phenomenon, the descriptive formulas comprising date developments.

24. The data modeling process according to claim 1, wherein the data preparation module performs a change of coordinates, stemming from a principal components analysis with possible simplification.

25. The data modeling process according to claim 1, wherein the data preparation module performs one or more temporal shifts before or after all or part of a column containing time variables.

26. The data modeling process according to claim 1, further comprising the step of exploring possible preparations by a preparation exploration module which uses a description of possible preparations provided by the user and an exploration strategy based either on a pure performance criterion in training or in generalization, or on a combination of the pure performance criterion and a capacity of the learning process obtained.

27. The data modeling process according to claim 1, wherein the modeling further comprises model exploitation performed by an exploitation module which provides monovariable or multivariable polynomial formulas descriptive of the phenomenon.

28. The data modeling process according to claim 1, wherein the data preparation module performs one or more of the following actions on <<nominal>> data to reduce the number of distinct values:
  calculation of the amount of information brought by each value;
  grouping with each other the values homogeneous in relation to the phenomenon under study;
  creation of a specific value regrouping all of elementary values not providing significant information on the phenomenon.

29. The data modeling process according to claim 1, wherein the data preparation module regroups missing, outlying or exceptional data into one or more groups to apply a specific processing to them.

30. The data modeling process according to claim 1, wherein the data preparation module performs encoding of "nominal" type data as tables of Boolean or real variables.

31. The data modeling process according to claim 1, wherein the data preparation module calculates for each input variable its explicative power in relation to the phenomenon under study.

32. The data modeling process according to claim 1, wherein the data preparation module uses segmentation algorithms.

33. The data modeling process according to claim 1, wherein the data preparation module associates with each value of a <<nominal>> type datum a numerical value representative of the phenomenon under study.

34. The data modeling process according to claim 1, wherein the data preparation module uses logical rules stemming from knowledge of the phenomena under study to encode dated data into Boolean values.

35. The data modeling process according to claim 1, wherein the data preparation module identifies periodic due dates and applies management rules to each due date.

36. The data modeling process according to claim 1, wherein the training data subset and the generalization data subset are not disjointed.

37. The data modeling process according to claim 1, further comprising storing and managing the data set and the formulas descriptive of the phenomenon in a relational structure which contains variables, phenomena and models.

38. The data modeling process of claim 1, wherein the training data subset and the generalization data subset are disjointed.

39. A device for modeling numerical data for forecasting a phenomenon from a data sample relating to the phenomenon, the device comprising:
  means for collecting input data;
  means for processing the input data;
  means for constructing an initial model by learning on the processed data;
  means for analyzing performances of the initial model; and
  means for optimizing the initial model to generate an optimal model, wherein the optimal model is generated in the form of a $D^{th}$ order polynomial derived from variables input into the modeling module by controlling a trade-off between learning accuracy and learning stability, the trade-off being controlled by adding to a covariance matrix a perturbation in the form of a product of a scalar $\lambda$ times a matrix H or in the form of a matrix H dependent on a vector of k parameters $\Lambda=(\lambda_1,\lambda_2,\ldots\lambda_k)$ during calculation of the optimal model, wherein the order D of the polynomial and the scalar $\lambda$, or the vector of parameters $\Lambda$, are determined automatically during model adjustment by the optimization module by integrating additional means for splitting the data so as to construct a first subset comprising training data used as a learning base for the modeling module and a second subset comprising generalization data used to build a model validity criterion to adjust the value of the order D, the scalar $\lambda$ or the vector of parameters $\Lambda$, and wherein the matrix H is a positive defined matrix of dimensions equal to a number p of variables input into the modeling module, plus one.

40. The device of claim 39, wherein the training data subset and the generalization data subset are disjointed.

* * * * *